(12) United States Patent
Takai (10) Patent No.: US 9,515,534 B2
(45) Date of Patent: Dec. 6, 2016

(54) ELECTROMAGNETIC COUPLING DEVICE HAVING ELECTROMAGNETIC COIL WITH ENDS FORMED BY TERMINAL LINES OF DIFFERENT METAL MATERIAL (75) Inventor: Kazuhiko Takai, Isesaki (JP)

(73) Assignee: SANDEN HOLDINGS CORPORATION, Isesaki-shi (JP)

( * ) Notice: Subject to any disclaimer, the term of this patent is extended or adjusted under 35 U.S.C. 154(b) by 469 days.

(21) Appl. No.: 14/114,475

(22) PCT Filed: Feb. 23, 2012

(86) PCT No.: PCT/JP2012/054351
§ 371 (c)(1),
(2), (4) Date: Oct. 28, 2013

(87) PCT Pub. No.: WO2012/147400
PCT Pub. Date: Nov. 1, 2012

(65) Prior Publication Data
US 2014/0049125 A1 Feb. 20, 2014

(30) Foreign Application Priority Data

Apr. 28, 2011 (JP) .................................. 2011-100589

(51) Int. Cl.
H02K 5/22 (2006.01)
F16D 27/112 (2006.01)
(Continued)

(52) U.S. Cl.
CPC ............. *H02K 5/225* (2013.01); *F16D 27/112* (2013.01); *F16D 27/14* (2013.01); *H01F 27/29* (2013.01);
(Continued)

(58) Field of Classification Search
CPC .................................................. H02K 5/225
(Continued)

(56) References Cited

U.S. PATENT DOCUMENTS 5,812,044 A * 9/1998 Sakamoto ............. F16D 27/112
192/84.1
5,984,069 A * 11/1999 Takahashi ............. F16D 27/112
192/84.1
(Continued)

FOREIGN PATENT DOCUMENTS

CN 1170097 1/1998
CN 1415866 5/2003
(Continued)

OTHER PUBLICATIONS

Korean Communication (and a partial English translation thereof) dated Aug. 21, 2014 issued in the corresponding Korean Patent Application No. 10-2013-7029434.

*Primary Examiner* — Thomas Truong
(74) *Attorney, Agent, or Firm* — Cozen O'Connor (57) ABSTRACT The present invention relates to an electromagnetic coupling device. In the electromagnetic coupling device according to the present invention, ends (5a and 5b) of a winding of an electromagnetic coil (5) are fitted to grooves of a terminal casing, and terminal members (19a and 19b) are press-fitted to a groove crossing the abovementioned groove, so that lead wires (18a and 18b) held by the terminal members (19a and 19b) are electrically connected to the ends (5a and 5b) of the winding. Terminal lines (51a and 51b) made of enameled copper wires are connected to the opposite ends of the winding of the electromagnetic coil (5) made of an aluminum wire, and the terminal lines (51a and 51b) handled as the ends (5a and 5b) of the winding are connected to brass-made connection pieces (29a and 29b) of the terminal members (19a and 19b).

4 Claims, 9 Drawing Sheets (51) Int. Cl.
*F16D 27/14* (2006.01)
*H01F 27/29* (2006.01)
*F16D 27/00* (2006.01)

(52) U.S. Cl.
CPC ... *F16D 2027/001* (2013.01); *F16D 2027/005* (2013.01)

(58) Field of Classification Search
USPC .......................................... 310/71, 103, 104
IPC ....................................................... H02K 5/22
See application file for complete search history.

(56) References Cited

U.S. PATENT DOCUMENTS

| | | |
|---|---|---|
| 6,587,024 B2 | 7/2003 | Matsumoto |
| 2009/0278640 A1* | 11/2009 | Oh .......................... F16D 27/14 335/220 |
| 2011/0048888 A1 | 3/2011 | Kurosu et al. |

FOREIGN PATENT DOCUMENTS

| | | |
|---|---|---|
| CN | 1144957 | 4/2004 |
| EP | 0 806 583 | 11/1997 |
| JP | S 63-12108 | 1/1988 |
| JP | 4-125320 | 4/1992 |
| JP | 9-296830 | 11/1997 |
| JP | 11-270589 | 10/1999 |
| JP | 3069044 | 7/2000 |
| JP | 2009-273354 | 11/2009 |
| JP | 2011-069489 | 4/2011 |

\* cited by examiner

ELECTROMAGNETIC COUPLING DEVICE HAVING ELECTROMAGNETIC COIL WITH ENDS FORMED BY TERMINAL LINES OF DIFFERENT METAL MATERIAL

RELATED APPLICATIONS

This application is a U.S. National Phase Application under 35 USC 371 of International Application PCT/JP2012/054351 filed Feb. 23, 2012.

This application claims the priority of Japanese application No. 2011-100589 filed Apr. 28, 2011, the entire content of which are hereby incorporated by reference.

TECHNICAL FIELD

The present invention relates to an electromagnetic coupling device having an electromagnet including an annular yoke internally provided with an electromagnetic coil and an insulative terminal casing fixed to the yoke, and more specifically, relates to a wire connection structure between the electromagnetic coil and a terminal member.

BACKGROUND ART

Conventionally, there has been a wire connection structure in an electromagnetic coupling device disclosed in, for example, Patent Document 1.

In the electromagnetic coupling device disclosed in the Patent Document 1, opposite ends of a winding of an electromagnetic coil led into a terminal casing are bent into grooves formed in the terminal casing, and terminal members connected to lead wires are pushed into grooves crossing the abovementioned groove, so that the respective ends of the winding of the electromagnetic coil are fitted to slits formed in the terminal members, and the terminal members (lead wires) are connected to the respective ends of the winding of the electromagnetic coil.

CITATION LIST

Patent Document

Patent Document 1: Japanese Patent No. 3069044

SUMMARY OF INVENTION

Problems to be Solved by the Invention

When an enameled copper wire is used as the winding of the electromagnetic coil, and is connected to the terminal member made of brass, electric continuity between the terminal member and the winding of the electromagnetic coil can be maintained even when a temperature changes because the copper and the brass are the same kind of metal and have similar coefficients of thermal expansion.

However, when the winding of the electromagnetic coil changes, for example, from the copper wire to an aluminum wire in order to reduce a weight of the electromagnetic coupling device, a higher coefficient of thermal expansion of the aluminum is higher than that of the brass that is the material of the terminal member, and therefore, the aluminum winding expands to widen the slit of the terminal member when a temperature rises. Conversely, when the temperature lowers, the aluminum winding shrinks to form a gap between the slit of the terminal member and the winding, so that the electric continuity between the winding of the electromagnetic coil and the terminal member may be lost.

Accordingly, an object of the present invention is to provide an electromagnetic coupling device in which a wire connection structure provided by press-fitting of a terminal member uses, as a material of an electromagnetic coil, a metal material different in kind from a material of the terminal member, and electric continuity of the terminal member can be stably maintained.

Means for Solving the Problem

In order to achieve the object, an electromagnetic coupling device according to the present invention includes an electromagnet formed of an annular yoke internally provided with an electromagnetic coil and an insulative terminal casing fixed to the yoke.

The terminal casing has a first groove to which opposite ends bent in a direction away from each other of a winding of the electromagnetic coil led into the terminal casing are fitted, and a second groove crossing the first groove.

The terminal casing has a pair of terminal members fitted to the second groove. The terminal members are connected to lead wires for connection to the ends of the winding, and the terminal member has a connection piece having a slit to which each of the ends of the winding extending across the second groove is fitted.

Materials forming the winding of the electromagnetic coil and the connection piece are different kinds of metal materials, the opposite ends of the winding of the electromagnetic coil are connected to terminal lines made of a metal material of the same kind as the material forming the connection piece, the terminal line is fitted to the first groove, and also fitted to the slit.

In the above structure, the terminal lines are connected to the opposite ends of the winding of the electromagnetic coil, the terminal line is fitted to the slit in the connection piece to ensure electric continuity between the lead wire connected to the terminal member and the winding of the electromagnetic coil. The terminal line fitted to the slit in the connection piece and the connection piece are made of the same kind of metal materials, and the winding of the electromagnetic coil is made of the metal material different in kind from that forming the terminal line and the connection piece.

Advantageous Effects of the Invention

In the electromagnetic coupling device according to the present invention, since the terminal line and the connection piece are made of the same kind of metal materials, they have similar coefficients of thermal expansion, and change their lengths and volumes to the substantially same extent in response to the changes in temperature. Therefore, expansion of the slit and occurrence of a gap between the terminal line and the connection piece according to the changes in temperature can be suppressed, and the electric continuity between the terminal line (the winding of the electromagnetic coil) and the connection piece (the lead wire) can be stably maintained. Furthermore, the winding of the electromagnetic coil can be made of the metal material different from that forming the connection piece and the terminal line. Therefore, the weight of the electromagnetic coupling device can be reduced by using a light-weight metal material such as an aluminum material.

MODE FOR CARRYING OUT THE INVENTION

Hereunder embodiments of the present invention will be described in detail with reference to the accompanying drawings.

Figure 1:
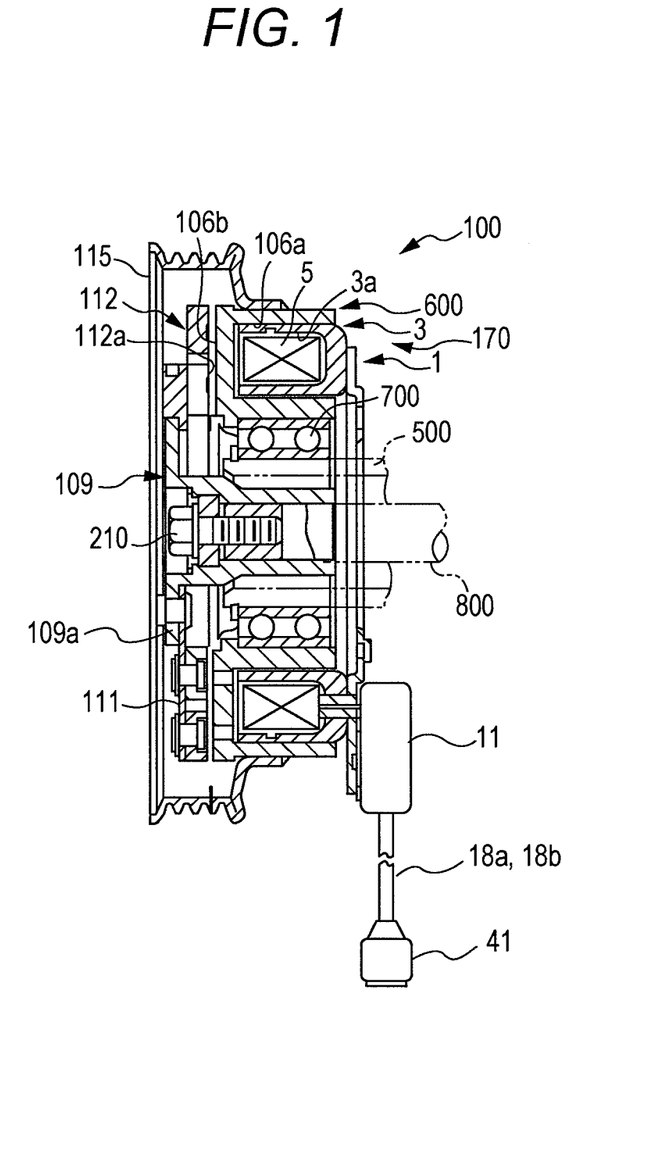
FIG. 1 is a cross sectional view illustrating an electromagnetic coupling device of an embodiment of the present invention.

FIG. 1 is a cross sectional view illustrating an electromagnetic coupling device (electromagnetic clutch) of an embodiment. The electromagnetic coupling device is a device employed in a coolant compressor forming an automobile cooling apparatus for controlling power transmission from a power source to a drive shaft of the compressor.

An electromagnetic coupling device 100 is provided with a yoke 3 fixed through an attaching plate 1 to a housing of a compressor (not illustrated).

An electromagnetic coil 5 is internally provided in an annular groove 3a of the yoke 3. A cylinder 500 of the compressor housing rotatably carries a rotor 600 having an annular groove 106a via a bearing 700 while restricting axial movement of the rotor 600, and the yoke 3 is loosely fitted to the annular groove 106a.

A flanged cylindrical hub 109 is fixed with a bolt 210 to an end of a drive shaft 800 of the compressor extending through the cylinder 500.

An armature 112 having a ring plate-like shape as a whole is attached to a plate spring 111 attached to a flange 109a of the hub in such a manner that a friction surface 112a of the armature 112 is facing to a friction surface 106b of a rotor 600.

A pulley 115 is coupled via a belt to a pulley arranged on a crank shaft of an automobile engine, and is configured to rotate together with the rotor 600 in accordance with rotation of the engine.

A connector 11 forms an electromagnet 170 together with the yoke 3, and the electromagnetic coil 5 is connected to an external electric circuit via the connector 11. A plug connector 41 for supplying a power to the electromagnet 170 is connected to ends of two lead wires (aluminum wires) 18a and 18b led from the connector 11.

A drive circuit (not illustrated) controls the on and off of the power supply to the electromagnetic coil 5 through the plug connector 41. By energizing the electromagnetic coil 5, the rotor 600 magnetically absorbs the armature 112 to transmit the rotation of the rotor 600 to the drive shaft 800.

Figure 2:
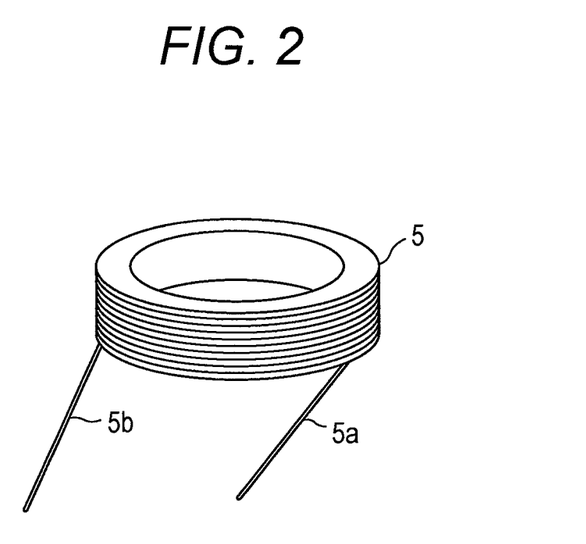
FIG. 2 is a perspective view illustrating an electromagnetic coil of the electromagnetic coupling device of FIG. 1.
Figure 3:
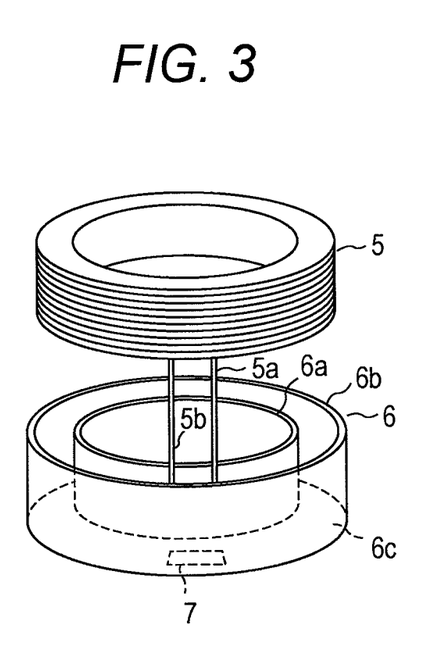
FIG. 3 is an exploded perspective view illustrating the electromagnetic coil of the electromagnetic coupling device in FIG. 1 and a ring accommodating the electromagnetic coil.

As illustrated in FIGS. 2 and 3, the yoke 3 has the electromagnetic coil 5 and a cylindrical ring 6 accommodating the electromagnetic coil 5.

The ring 6 has a first ring portion 6a, a second ring portion 6b arranged coaxially to and radially outside the first ring portion 6a with a predetermined distance therebetween, and a bottom 6c connecting ends on one side of the first and second ring portions 6a and 6b together.

The bottom 6c and the attaching plate 1 are provided with a through hole 7 through which opposite ends 5a and 5b of the winding of the electromagnetic coil 5 directly extend to the outside of the bottom 6c. The electromagnetic coil 5 is fitted to be fixed to the ring 6 with a resin material.

Figure 4:
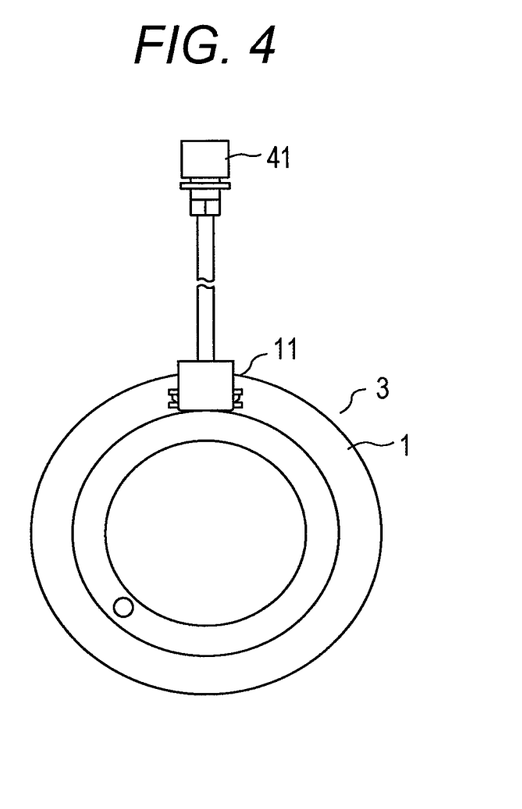
FIG. 4 is a front view illustrating an electromagnet of the electromagnetic coupling device in FIG. 1.

As illustrated in FIG. 4, the connector 11 is fixed above the through hole 7 formed in the attaching plate 1 by caulking, for example, with claws formed at the through hole 7 of the attaching plate 1.

Figure 5:
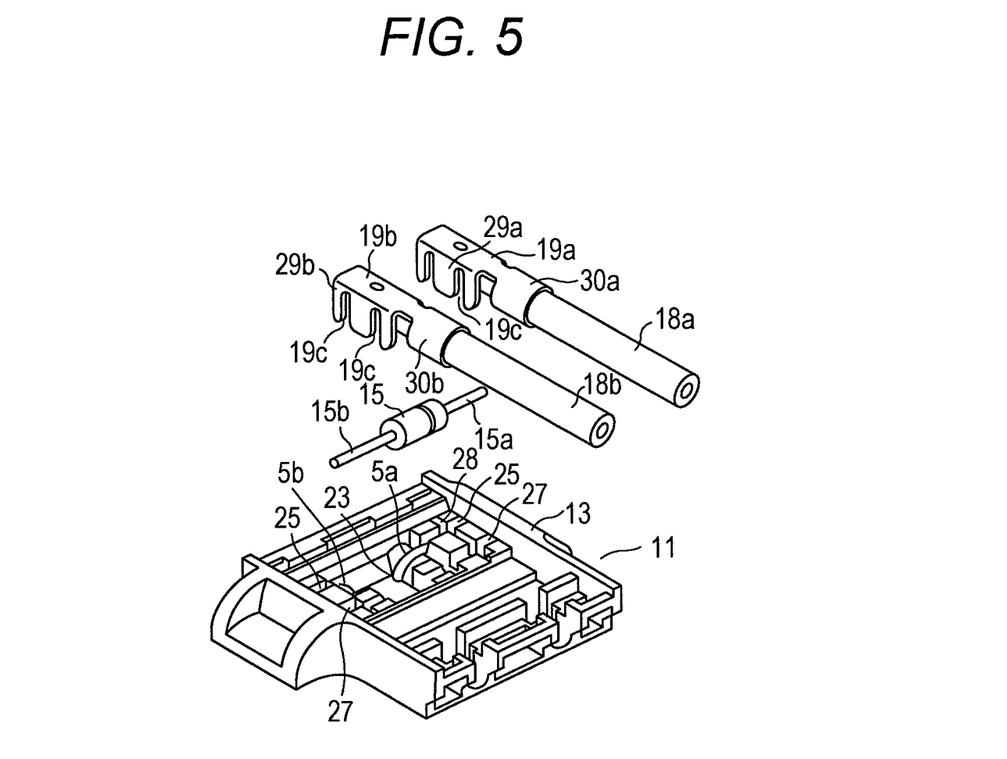
FIG. 5 is an exploded perspective view illustrating a connector in the electromagnet of the electromagnetic coupling device of FIG. 1.

The connector 11 has, as illustrated in FIG. 5, an electrically insulated terminal casing 13 having an upper opening, the ends 5a and 5b of the winding inserted into the terminal casing 13, a diode 15, and two electrically conductive terminal members 19a and 19b made of brass and connected to respective ends on one side of the two lead wires 18a and 18b. The other ends of the two lead wires 18a and 18b are connected to a plug connector 41 supplying a power to the winding.

The terminal casing 13 is provided at its bottom with a pair of casing apertures 23 located laterally symmetrically with respect to an imaginary line containing a center of the ring 6. The opposite ends 5a and 5b of the winding extend through the paired casing apertures 23.

The terminal casing 13 is provided at its inside with: a pair of first grooves 25 formed for fitting the ends 5a and 5b of the winding, and extending laterally with respect to the imaginary line containing the center of the ring 6 from the pair of casing apertures 23; and a pair of third grooves 27 formed for fitting leads 15a and 15b on the opposite sides of the diode 15, and formed in parallel with the first grooves 25. The ends 5a and 5b of the winding are bent in a direction away from each other and are fitted to the first grooves 25. The leads 15a and 15b on the opposite sides of the diode 15 extend away from each other, and are fitted to the third grooves 27. That is, the ends 5a and 5b of the winding are parallel to the leads 15a and 15b of the diode 15 when these are fitted inside the terminal casing 13.

Inside the terminal casing 13, there is formed a pair of second grooves 28 which crosses the first and third grooves 25 and 27, and extends parallel to the imaginary line containing the center of the ring with the imaginary line located therebetween. The leads 15a and 15b of the diode 15 fitted parallel to each other and intermediate portions of the ends 5a and 5b of the winding extend across the second grooves 28.

As illustrated in FIG. 5, the leads 15a and 15b as well as the intermediate portions of the ends 5a and 5b of the winding are connected to the lead wires 18a and 18b by press-fitting the pair of terminal members 19a and 19b from above to the second grooves 28.

The pair of terminal members 19a and 19b are formed of cylindrical holders 30a and 30b holding insulative coatings of the lead wires 18a and 18b, and connection pieces 29a and 29b formed integrally with the holders 30a and 30b, and having U-shaped sections.

In the connection pieces 29a and 29b, bottoms of the U-shaped sections extend on extensions of the lead wires 18a and 18b. Each of substantially parallel side walls facing to each other and forming the U-shaped section is provided with a pair of slits 19c each opened toward the open side of the U-shaped section and extending toward the bottom of the U-shaped section. The paired slits 19c are spaced from each other in the extending direction of the corresponding lead wire 18a or 18b.

Each pair of the slits 19c are formed in accordance with a positional relationship between the first and third grooves 25 and 27, so that the ends 5a and 5b of the winding fitted to the first grooves 25 are fitted to the slits 19c (first slits) formed on the tip end side among the paired slits 19c, and the leads 15a and 15b of the diode 15 fitted to the third grooves 27 are fitted to the slits 19c (second slits) near the holders 30a and 30b.

Figure 6:
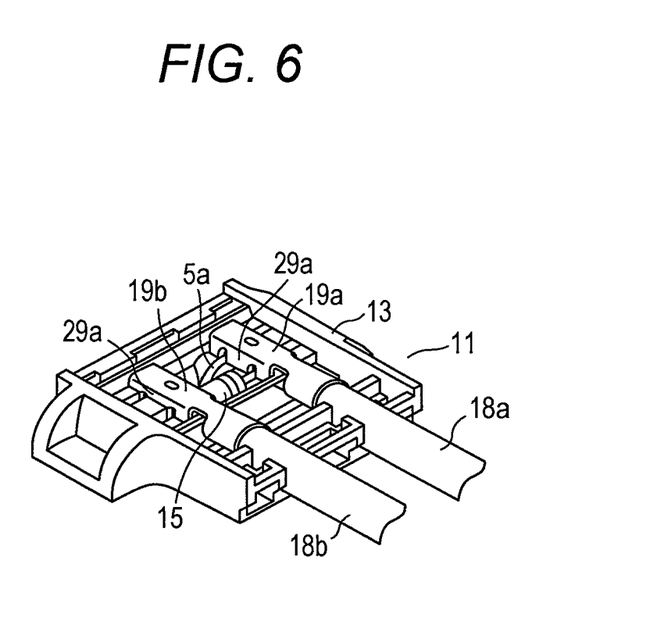
FIG. 6 is a perspective view illustrating an assembled state of the connector illustrated in FIG. 5.

In fitting the pair of terminal members 19a and 19b to the second grooves 28, the press-fitting is performed to direct the open ends of the U-shaped sections of the connection pieces 29a and 29b toward the bottom of the terminal casing 13, so that, as illustrated in FIG. 6, the leads 15a and 15b as well as the intermediate portions of the ends 5a and 5b of the winding are press-fitted to the paired slits 19c of the terminal members 19a and 19b, and are electrically connected thereto.

Thus, by press-fitting the terminal members 19a and 19b to the second grooves 28, the diode 15 and the winding of the electromagnetic coil 5 can be connected to the lead wires 18a and 18b, and the connection operation can be performed easily.

Figure 7:
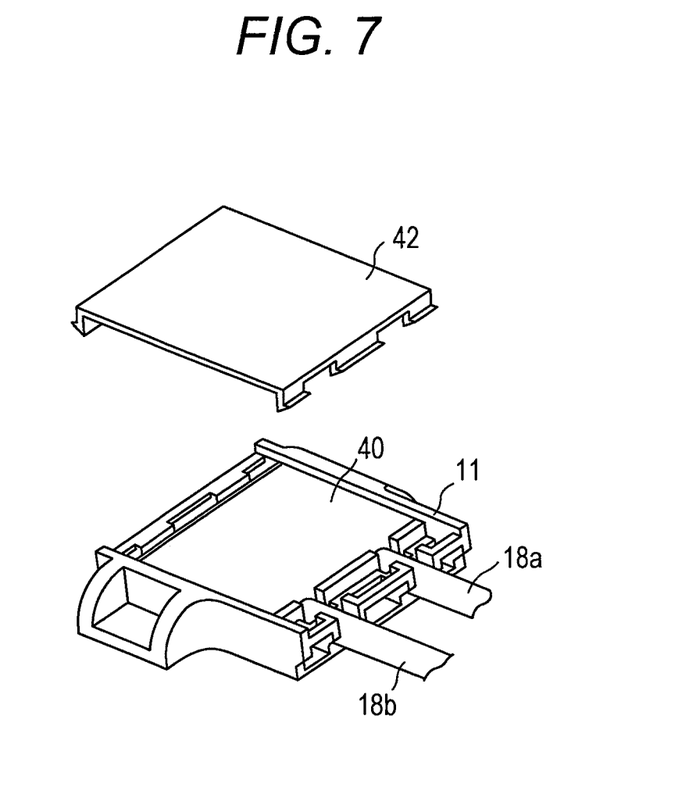
FIG. 7 is an exploded perspective view illustrating the connector and a lid illustrated in FIG. 5.

As illustrated in FIG. 6, the terminal members 19a and 19b are press-fitted to the second grooves 28 to connect the leads 15a and 15b to the intermediate portions of the ends 5a and 5b of the winding, respectively. Thereafter, for forming a water-proof structure in these connected portions, as illustrated in FIG. 7, an inside of the terminal casing 13 is sealingly filled by bonding with a resin member 40, and an opening of the terminal casing 13 is closed with a lid 42 while the resin member 40 is in an uncured state.

Figure 8:
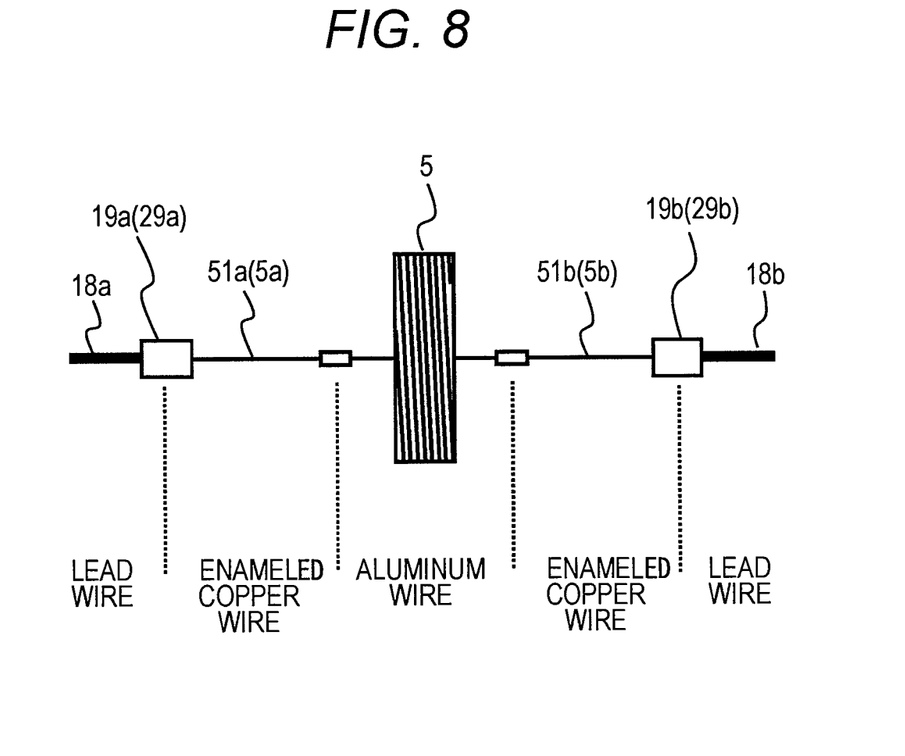
FIG. 8 is a schematic view illustrating a wiring structure in the embodiment of the present invention.

As illustrated in FIG. 8, the winding of the electromagnetic coil 5 is formed of an aluminum wire, and an end of the aluminum-wire electromagnetic coil 5 is connected to an enameled-copper-wire (that is, leads made of copper wires covered with enamel) terminal line 51a, and the other end of the aluminum-wire electromagnetic coil 5 is connected to an enameled-copper-wire 51b. The ends of the terminal lines 51a and 51b handled as the ends 5a and 5b of the winding, are led into the terminal casing 13 through the casing apertures 23, and are fitted to the first grooves 25. When the terminal members 19a and 19b are fitted to the second grooves 28, the terminal lines 51a and 51b are fitted to the slits 19c of the connection pieces 29a and 29b, respectively.

That is, the aluminum winding of the electromagnetic coil 5 is connected to the lead wires 18a and 18b through the terminal lines 51a and 51b made of the enameled copper wires. In the terminal members 19a and 19b, the connection pieces 29a and 29b are in contact with the terminal lines 51a and 51b for electrical conduction, respectively.

The enamel coatings of the enameled copper wires forming the terminal lines 51a and 51b are peeled off by the slits 19c when they are fitted to the slits 19c, so that the inner copper wires are in contact with the respective connection pieces 29a and 29b for electrical conduction.

Figure 9:
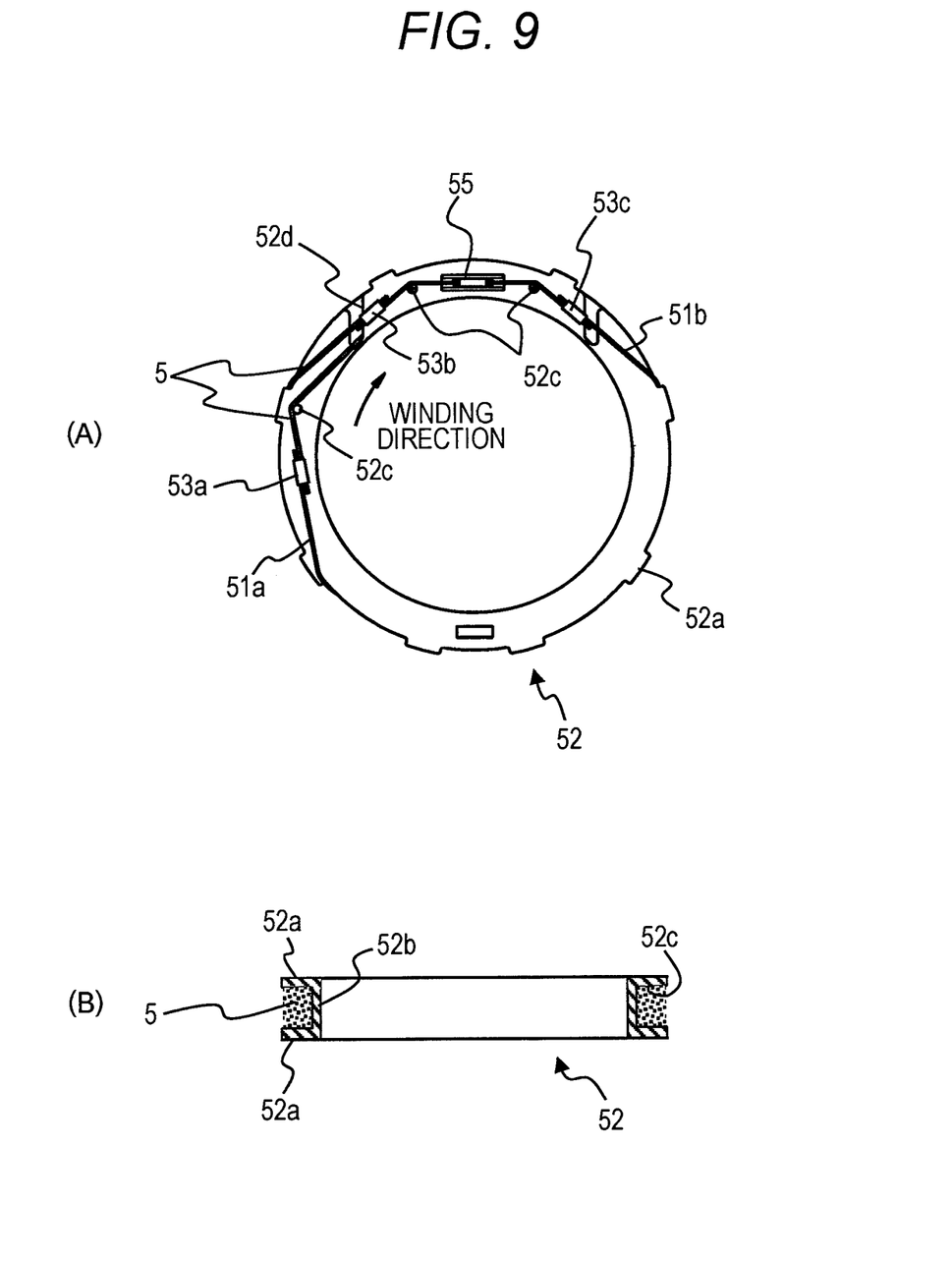
FIGS. 9A and 9B are a front view and a cross sectional view, respectively illustrating a coil bobbin employing the wiring structure in FIG. 8.

FIG. 9 illustrates a bobbin 52 employing the wiring structure illustrated in FIG. 8.

The bobbin 52 illustrated in FIG. 9 is formed of a cylinder 52b and flanges 52a each of which continue to the end surface in the central axis direction of the cylinder 52b. An annular groove 52c formed by the flanges 52a and the cylinder 52b accommodates the aluminum winding of the electromagnetic coil 5.

In FIG. 9, the terminal line 51a is located on a winding-start side. One end of the terminal line 51a (enameled copper wire) is held by the terminal casing 11, and the other end thereof is led from the cylinder 52b to the outside of the flanges 52a, and the terminal line 51a is connected to one end (winding-start side) of the winding of the electromagnetic coil 5 formed of the aluminum wire by caulking a coil terminal 53a.

The winding (aluminum wire) of the electromagnetic coil 5 connected to the terminal line 51a is positioned by positioning portions 52c formed on the flanges 52a, is extended clockwise in FIG. 9 along the outer side of the flange 52, then is returned to the cylinder 52b through a recess 52d formed in the flange 52a, and is wound clockwise around the cylinder 52b.

The winding end of the winding (aluminum wire) of the electromagnetic coil 5 is led from the cylinder 52b to the outside of the flange 52a. An end of a thermal fuse 55 is connected by caulking a coil end 53b to the end on the winding-end side of the winding (aluminum wire) of the electromagnetic coil 5. Furthermore, the other end of the thermal fuse 55 is connected to an end of the terminal line 51b by caulking a coil terminal 53c.

The winding end of the winding (aluminum wire) of the electromagnetic coil 5, the thermal fuse 55, and the terminal line 51b are positioned by the positioning portions 52c formed on the flanges 52a, and extend clockwise in FIG. 9 along the outer side of the flange 52a, and the other end of the terminal line 51b is led into the terminal casing 13 through the outer periphery of the electromagnetic coil 5.

The winding of the electromagnetic coil 5 extending along the outer surface of the flange 52a, the thermal fuse 55, and the terminal lines 51a and 51b are sealed up with resin together with the coil terminals 53a to 53c. The sealing with the resin can suppress rusting due to entry of water to the winding (aluminum wire) of the electromagnetic coil 5.

Without interposing the thermal fuse 55, the winding end of the winding (aluminum wire) of the electromagnetic coil 5 may be connected to one end of the terminal line 51b, of which other end may be led into the terminal casing 13.

As described above, an end of the aluminum-wire electromagnetic coil 5 is connected to the enameled-copper-wire terminal line 51a, and the other end of the aluminum-wire electromagnetic coil 5 is connected to the enameled-copper-wire terminal line 51b. The terminal lines 51a and 51b are led into the terminal casing 11 through the casing apertures 23, and are connected to the connection pieces 29a and 29b, respectively.

The terminal lines 51a and 51b are formed of the enameled copper wires, and the connection pieces 29a and 29b connected to the terminal lines 51a and 51b are made of brass. That is, the terminal lines 51a and 51b, and the connection pieces 29a and 29b are made of the same kind of metal materials (copper-based materials). However, the winding of the electromagnetic coil 5 is made of the material (aluminum-based material) different in kind from the materials forming the terminal lines 51a and 51b, and the connection pieces 29a and 29b.

Since the aluminum forming the winding of the electromagnetic coil 5 is lighter than the copper in weight, the weight of the electromagnetic coil 5 (electromagnet) and the electromagnetic coupling device can be reduced.

If the winding of the electromagnetic coil 5 that is the aluminum wire is brought into contact with the connection pieces 29a and 29b made of brass for connection, contact occurs between different kinds of metal materials having different coefficients of thermal expansion. Therefore, when a temperature changes, the slit 19c may expand, and a gap may appear between the slit 19c and the aluminum wire. Thus, the aluminum wire (winding of the electromagnetic coil 5) may be disconnected from the connection pieces 29a and 29b (terminal members 19a and 19b) made of the brass.

Conversely, in the embodiment, one end of the aluminum wire electromagnetic coil 5 is connected to the enameled-copper-wire terminal line 51a, and the other end of the aluminum wire electromagnetic coil 5 is connected to the enameled-copper-wire terminal line 51b, and the terminal lines 51a and 51b are further connected to the connection pieces 29a and 29b made of the brass, respectively. Since the terminal lines 51a and 51b, and the connection pieces 29a and 29b are made of the same kind of metal materials, and have similar coefficients of thermal expansion, it is possible to suppress expansion of the slit 19c and formation of the gap between the slits 19c and the terminal lines 51a and 51b due to the changes in temperature, and the electric continuity between the winding of the electromagnetic coil 5 and the lead wires 18a and 18b can be stably maintained.

Furthermore, the winding of the electromagnetic coil 5 can be electrically connected to the lead wires 18a and 18b by press-fitting the terminal members 19a and 19b to the second grooves 28. Therefore, the wire connection structure can be simple and inexpensive, and the connection operation can be easily performed.

Furthermore, connection pieces 29a and 29b are made of the brass having good ductility. Therefore, the connection pieces 29a and 29b allows easy working. Since the terminal lines 51a and 51b are made of the copper that has good electrical conductivity and is the same kind of metal material as the brass forming the connection pieces 29a and 29b, good conductivity can be ensured between the terminal lines 51a and 51b, and the connection pieces 29a and 29b.

By connecting the terminal line 51b to one of the ends of the winding of the electromagnetic coil 5 through the thermal fuse 55, the thermal fuse 55 can be blown by heat generated by sliding of the clutch friction surfaces due to seizure of the compressor. Therefore, the power supply to the electromagnetic coil 5 is shut down, thereby protecting a belt on a vehicle side.

Although the contents of the present invention have been described with reference to the preferred embodiment, it will be apparent to those skilled in the art that various changes and modifications can be made herein based on the basic technical concept and teaching of the present invention.

For example, the structure of the electromagnetic coupling device is not restricted to that illustrated in FIG. 1, and the wire connection structure of the present invention as well as the wire connection structure formed of the winding of the electromagnetic coil 5 and the terminal lines 51a and 51b on the opposite ends thereof can be applied to known electromagnetic coupling devices using the electromagnet.

In the above embodiment, the electromagnetic coil 5 and the lead wires 18a and 18b are made of aluminum, the connection pieces 29a and 29b are made of brass, and the terminal lines 51a and 51b are made of copper. However, this combination of the metal materials is not limited, and it is merely required that the electromagnetic coil 5 is made of the metal material different in kind from that of the connection pieces 29a and 29b, and the same kind of metal materials having similar coefficients of thermal expansion are employed as the material of the connection pieces 29a and 29b, and the material of the terminal lines 51a and 51b.

For example, the winding of the electromagnetic coil 5 may be made of aluminum alloy, and the terminal lines 51a and 51b made of copper alloy may be combined with the connection pieces 29a and 29b made of the brass.

The connection pieces 29a and 29b may be prepared by plated metal of the same kind as the metal material forming the terminal lines 51a and 51b.

Furthermore, the material for coating and insulating the terminal lines 51a and 51b may be polyurethane, vinyl or the like instead of the enamel.

REFERENCE SIGNS LIST

1 Attaching plate
2 Yoke
5 Electromagnetic coil (aluminum wire)
5a, 5b End of winding
7 Through hole
13 Terminal casing
15 Diode
15a, 15b Lead of diode
18a, 18b Lead wire
19a, 19b Terminal member
19c Slit
25 First groove
27 Third groove
28 Second groove
29a, 29b Connection piece (made of brass)
51a, 51b Terminal line (Enameled copper line)
55 Thermal fuse
100 Electromagnetic coupling device
170 Electromagnet

The invention claimed is:

1. An electromagnetic coupling device comprising
an electromagnet including an annular yoke internally provided with an electromagnetic coil, and an insulative terminal casing fixed to the yoke, wherein
the terminal casing has a first groove to which opposite ends bent in a direction away from each other of a winding of the electromagnetic coil are fitted, the electromagnetic coil is led into the terminal casing, and a second groove crossing the first groove,
the terminal casing has a pair of terminal members fitted to the second groove, the terminal members are connected to lead wires for conduction to the ends of the winding, and for connection with an external electric circuit for supplying a power the terminal member has a connection piece having a slit into to which each of the ends of the winding extending across the second groove is press-fitted, and
materials forming the winding of the electromagnetic coil and the connection piece are different kinds of metal materials, the opposite ends of the winding of the electromagnetic coil are respectively connected to terminal lines by caulking coil terminals, the terminal lines are made of a metal material that is different in kind from the material forming the winding of the electromagnetic coil, an end of each terminal line forms an end of the electromagnetic coil and is fitted to the first groove, and the terminal line, made of a material that is the same in kind as the material forming the connection piece, is fitted to the slit formed in the connection piece.

2. The electromagnetic coupling device according to claim 1, wherein the winding of the electromagnetic coil is made of an aluminum-based material, and the connection piece and the terminal line are both made of a copper-based material.

3. The electromagnetic coupling device according to claim 2, wherein the connection piece is made of brass, and the terminal line is made of a copper wire.

4. The electromagnetic coupling device according to claim 1, wherein one of the ends of the winding of the electromagnetic coil is connected to the terminal line via a fuse.

* * * * *